Nov. 3, 1964 F. H. PLANKEEL 3,155,452

TRACE REPRODUCING SYSTEM

Filed Dec. 7, 1961 2 Sheets-Sheet 1

INVENTOR:
FREDERIK H. PLANKEEL
BY: Theodore E. Bieber
HIS ATTORNEY

Nov. 3, 1964 F. H. PLANKEEL 3,155,452

TRACE REPRODUCING SYSTEM

Filed Dec. 7, 1961 2 Sheets-Sheet 2

INVENTOR:
FREDERIK H. PLANKEEL
BY: Theodore E. Bieber
HIS ATTORNEY

United States Patent Office 3,155,452

Patented Nov. 3, 1964

3,155,452
TRACE REPRODUCING SYSTEM

Frederik Hendrik Plankeel, Rijswijk, Netherlands, assignor to Shell Oil Company, New York, N.Y., a corporation of Delaware Filed Dec. 7, 1961, Ser. No. 157,677
3 Claims. (Cl. 346—31)

This invention pertains to reproduction equipment and more particularly to an apparatus designed to follow a recorded trace and reproduce it either in the same form or a different form.

In seismic exploration vast amounts of geophysical data have been recorded in the form of photographic records of galvanometer movements, commonly called swiggle seismograms. These seismograms have yielded only a very small portion of the information that can be extracted from them by modern methods. These modern methods require that seismograms be recorded in a different form than the original seismograms, for example, on magnetic tape or as variable area seismograms. In an attempt to re-record the seismograms in a more useful form, various apparatus have been developed. These apparatus consist of a trace follower that traces the original seismogram and transfers the information to a magnetic tape or variable area seismogram. In this type of trace follower the record is attached to a suitable means and moved laterally past a light sensitive means. The light sensitive means is disposed so that it may be moved laterally to the movement of the record and is controlled by a servomechanism in such a way that it always seeks the point at which it receives the least light from the brightly illuminated record. The trace on a photographic seismic record will usually appear the darkest at its middle and thus the light sensitive means will follow the center of the trace.

The above trace follower has the disadvantage that often it does not follow the desired trace when the two traces intersect. The intersection of traces occurs often in seismograms and thus the trace follower has proven to be unsatisfactory.

Accordingly, the principal object of this invention is to provide a reproduction apparatus which will accurately follow a recorded trace and utilize a unique means for following the desired trace at the intersection of two traces.

A further object of this invention is to provide a novel trace reproducing equipment that is provided with a means for causing it to move back to the desired trace when it follows the wrong trace at an intersection point of two traces.

The above objects and advantages of this invention are achieved by providing a drum on which the record containing the trace to be reproduced is mounted. The drum is driven at a constant speed by a synchronous motor or other drive means. Light means are disposed adjacent the drum to brightly illuminate the portion of the record containing the trace that is to be reproduced. Two lens means are to be disposed on opposite sides of the illuminating means and adjusted so as to focus the light reflected from the record on two photoconductive cells. The photoconductive cells are disposed to view or follow the opposite edges of the recorded trace. Each of the photoconductive cells is positioned by a servo-follow mechanism to follow the trace. The movement of the photoconductive cells is used to position a recording mechanism to record in the desired form, the trace being followed.

Switch means are disposed in the servo-follower mechanisms to control the minimum and maximum thickness of the trace followed by two photoconductive cells. In addition a continuity switch is disposed in each of the servo-follower mechanisms to provide an indication of whether the photoconductive cells are moving at a constant rate record and thus following a smooth trace. By properly combining the signals from the continuity switches with the signals from the switches that are closed when the cells indicate trace having more than the maximum or minimum thickness the servo-mechanisms can be energized to reposition or move the photoconductive cells back to their proper traces when they follow the wrong trace at an intersection of two traces.

The above objects and advantages of this invention will be more easily understood from the following detailed description when taken in conjunction with the attached drawings, in which.

Figures 1, 3:
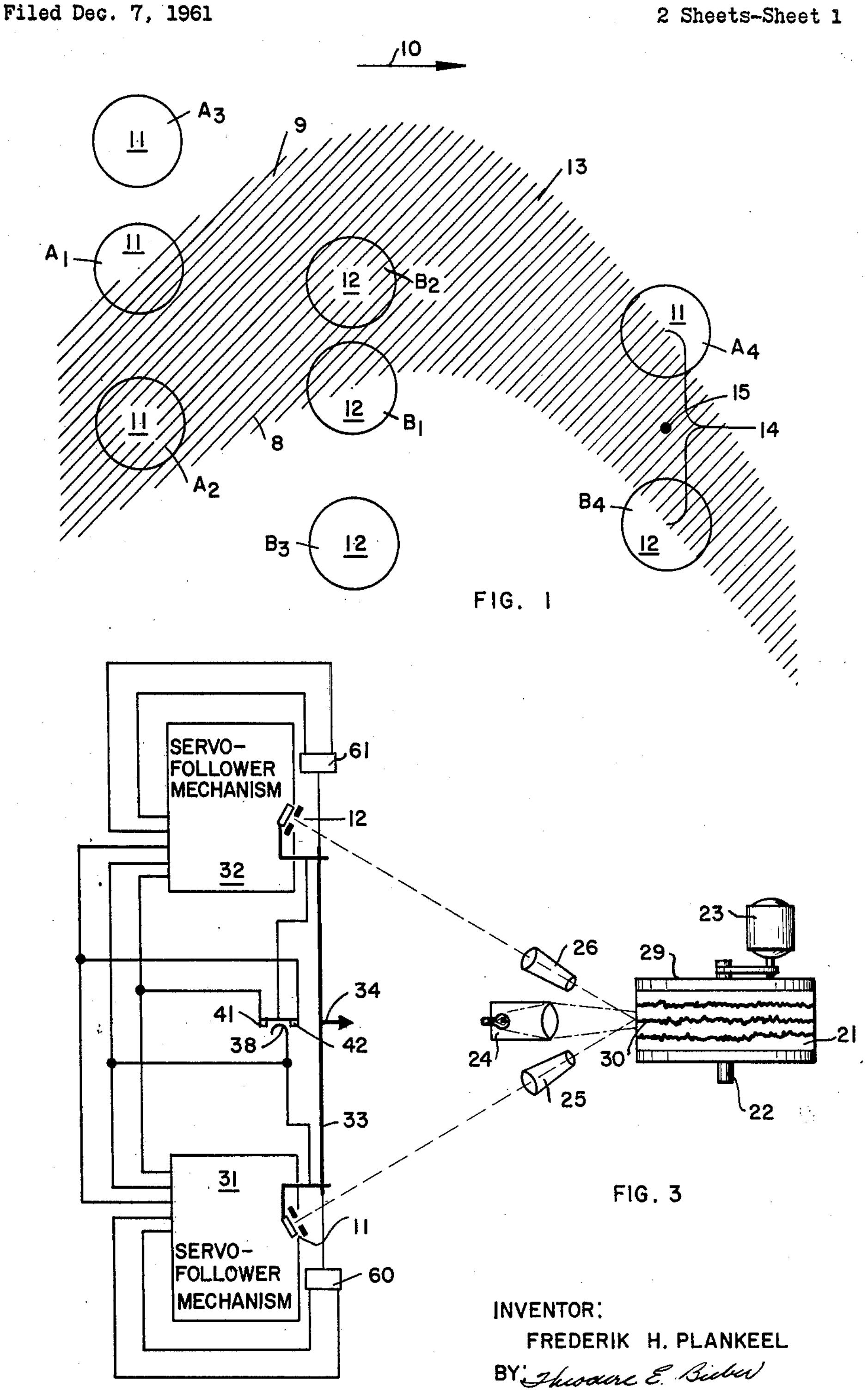
FIGURE 1 is an enlarged view of a trace showing how the photoconductive cells follow edges of the trace.
FIGURE 3 is a schematic drawing of one embodiment of this invention.

Referring now to FIGURE 1, there is shown an enlarged portion 13 of a trace that is to be reproduced. The record on which the trace is recorded is traveling in the direction illustrated by the arrow 10 and its upper edge 9 is viewed by a photoconductive cell 11 and its lower edge 8 by a photoconductive cell 12. The two photoconductive cells 11 and 12 are shown in three positions $A_1$, $A_2$ and $A_3$, and $B_1$, $B_2$ and $B_3$, respectively. Positions $A_1$ and $B_1$ are their normal positions in which half of each photoconductive cell views the trace 13 while the other half views the background of the photographic record. If the cell moves to the position $A_2$ or $B_2$ it will be viewing only the record and the servo-mechanism described below will tend to move it back towards the positions $A_1$ and $B_1$, while if the cell moves to the positions $A_3$ or $B_3$ the servo-mechanism will tend to move it in the opposite direction to return it to the normal positions $A_1$ and $B_1$. At the right-hand edge of FIGURE 1 the two cells 11 and 12 are shown in their normal positions $A_4$ and $B_4$ where they are spaced apart a distance 14. The center 15 of this distance is the point used for reproducing the recorded trace in the same or an altered form. Thus, the reproduction record is substantially the same as the original record except for changes in form.

Figure 2:
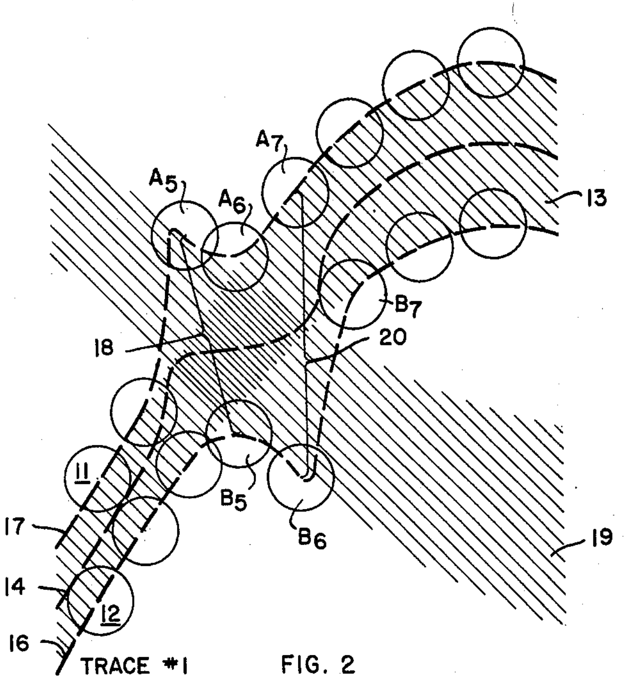
FIGURE 2 is an enlarged view of the intersection point of two traces showing how the photoconductive cells will follow the wrong trace at the intersection and then be repositioned by the mechanism of this invention.

Referring now to FIGURE 2, there is shown an enlarged portion of the intersection of the trace 13 with a second trace 19. The photoconductive cell 11 traces a path indicated by the dotted line 17 while the photoconductive cell 12 traces a path indicated by the dotted line 16 with the resulting reproduced trace being indicated by the line 14. When photo cell 12 reaches the intersection of the two traces it is assumed to follow the lower edge of the trace 19 as indicated by the positions $B_5$ and $B_6$, while the photoconductive cell 11 is assumed to follow the upper edge of the trace 19 as indicated by the positions $A_5$ and $A_6$. It is seen that when the photoconductive cell 11 reaches a position $A_6$ it will return to the upper edge of the trace 13 and assume a position $A_7$. The photoconductive cell 11 will be returned to the position $A_7$ by the servo-follower mechanism that is actuated by the closing of the continuity and maximum thickness switches as described below. In this position, the photoconductive cells 11 and 12 will be displaced a distance indicated by the line 20. This distance will still be great enough to actuate the maximum thickness switch and the change in direction of travel of the photoconductive cell 12 will cause the continuity switch to close as described below. The closure of these two switches will cause the servo-follower mechanism that positions photoconductive cell 12 to move the photoconductive cell towards a new position $B_7$ where it again traces the lower edge of the trace 13. In addition to the maximum thickness switch there is also provided a minimum thickness switch for each of the photoconductive cells. When either the minimum thickness or maximum thickness switch is closed in combination with the closure of continuity switch for either of the two photoconductive cells the servo-mechanism will be actuated to move the two cells either closer together or farther apart depending on whether the minimum thickness or maximum thickness switches were actuated.

Shown in FIGURE 3 is an apparatus for performing the method of this invention. The photographic record 21 of the seismic traces is mounted on a drum 29 supported by a shaft 22. The drum 29 is driven at a constant speed by a suitable drive means, for example, a synchronous motor 23. The portion of the record 21 containing the trace to be reproduced, is illuminated by a light means 24. The illuminated portion of the record 21 is viewed by two lens means 25 and 26 that are disposed to focus the light from the record onto the two photoconductive cells 11 and 12. The two lens means 25 and 26 in addition amplify the center portion of the record 21 containing the trace 30 that is to be reproduced by the apparatus of FIGURE 3.

Photoconductive cells 11 and 12 are disposed on the movable mechanism of servo-follower mechanisms 31 and 32. Each of the servo-follower mechanisms is designed to position the photoconductive cell laterally to the movement of the record 21 to cause a predetermined amount of light to fall on the photoconductive cell. The record 21 being a normal photographic print of the seismic traces will have the seismic traces in black on a white background. Thus, the servo-follower mechanisms can be adjusted to cause the photoconductive cells to view a portion of the trace 30 and a portion of the background of the record 21. In order to adjust the servo-follower mechanisms to cause the photocells to view this portion of the record, it is only necessary to set the servo-follower mechanism to respond to a predetermined signal from the photoconductive cells. For example, as explained above, with reference to FIGURES 1 and 2, the photoconductive cells are preferably adjusted to view the edges of the records. Numerous types of servo-follower mechanisms are available for performing the function of the servo-follower mechanisms 31 and 32, for example, potentiometer recorders may be used for this purpose. The two photoconductive cells 11 and 12 are coupled together by means of a bar member 33 whose center portion 34 drives the recording element that reproduces the trace 30.

Figure 4:
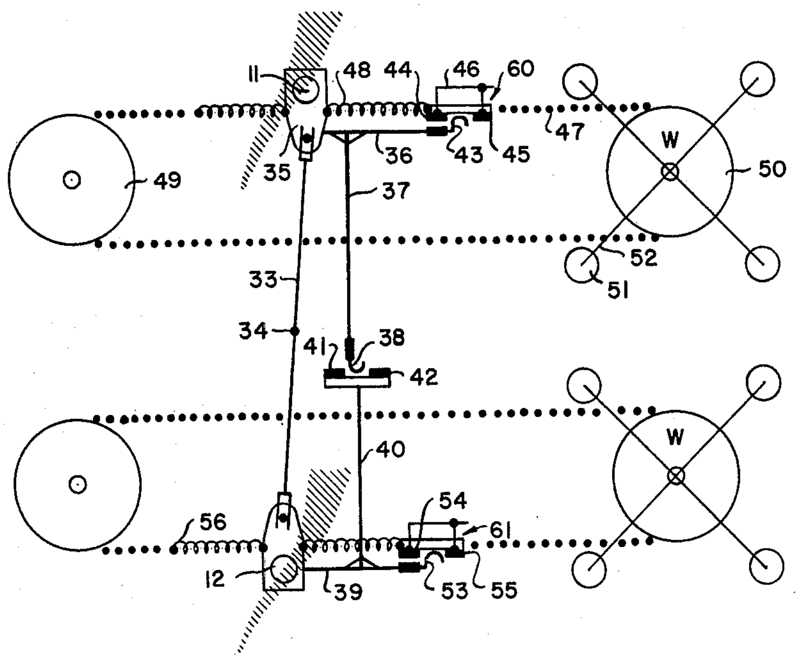
FIGURE 4 is a schematic drawing of the switch means showing how the continuity and maximum convergence and minimum divergent switches are operated.

Shown in FIGURE 4 are the switch means used to actuate the servo-follower mechanisms 31 and 32 to cause them to reposition the two photoconductive cells 11 and 12 when one or both cells follow the wrong trace at the intersection of two traces. The photo cell 11 is mounted on the movable member 35 of the servo mechanism 31. Extending horizontal from the member 35 is a bar 36 having a downwardly extending member 37 carrying a contact 38 at its lower end. Photo cell 12 is mounted on the movable member of the servo-follower mechanism 32 and has a bar 39 extending horizontally therefrom. Extending upwardly from the bar 39 is a second bar member 40 that carries two contacts 41 and 42 at its upper end. The contacts 38, 41 and 42 are disposed adjacent each other to form a switch means. As is seen in FIGURE 4, if the photoconductive cells 11 and 12 are properly positioned with relation to the trace being reproduced the switch remains open. If either of the photoconductive cells 11 and 12 tend to converge or diverge by an amount which may be determined by the spacing between the contacts 41 and 42 the switch means will close. Thus, the combination of the contacts 38 and contacts 41 and 42 form the minimum and maximum thickness switch means referred to above.

The continuity switch means 60 for the photoconductive cell 11 is formed by two contacts 45 and 44 disposed on an endless chain belt 47 and a contact 43 disposed on the end of the member 36. The photoconductive cell 11 is disposed to drive the chain belt 47 through a spring or other resilient connection 48 with the chain 47 passing over two sheaves 49 and 50. A means for varying the inertia of the chain and sheave system is provided on the sheave 50 and consists of a plurality of arm members 52 having weights 51 disposed thereon. The radial displacement of the weights 51 on the arms 52 may be changed, thus varying the inertia of the system.

The continuity switch operates when the photoconductive cell 11 tends to follow the wrong trace at an intersection of two traces and causes an interruption of the smooth trace being followed by the cell. The servo-follower mechanism then increases its speed in an attempt to have the cell 11 catch up with the new trace. This increase in speed will cause the switch means to close, thus signalling a break in continuity of the travel of the photoconductive cell 11.

The continuity switch 61 for the cell 12 is similar in construction to that described above for the cell 11. The continuity switch consists of a contact 53 disposed on the end of the member 39 and contacts 54 and 55 which are disposed to be moved by the chain belt drive.

From the above description, it can be appreciated that this invention has provided a simple means by which a recorded trace may be reproduced in the same or a different form. This invention provides a means by which the reproduction equipment will be re-adjusted automatically at the intersection of two traces in order to reposition the equipment on the correct trace. This repositioning is actuated by the minimum and maximum thickness switches shown in FIGURE 4 in cooperation with the continuity switches 60 and 61. These switches are operated by the movement of the cells 11 and 12 as explained above. For example, when the cells 11 and 12 tend to converge they will operate the switch formed by the contacts 38 and 42 while if they tend to diverge they will operate the switch formed by the contacts 38 and 41. In cases where one of the cells tends to follow the wrong trace at an intersection point, it will operate its associated continuity switch due to the increase in speed of the drive mechanism of the servo-follower mechanism. As explained above with reference to FIGURE 2, if either the minimum or maximum thickness switch is closed and one of the continuity switches is also closed, the servo-mechanism driving the particular photo cell whose continuity switch is closed will be activated to reposition this cell to cause it to move back onto the proper trace. The direction of movement will be governed by the particular thickness switch that is closed while the servo-mechanism that is actuated depends on the continuity switch that is actuated. Assuming that the minimum thickness switch is closed and then the continuity switch 60 closes the servo-mechanism 31 will be actuated. The servo-mechanism will move the photoconductive cell 11 away from the photoconductive cell 12 until the minimum thickness switch opens. The opening of the minimum thickness switch will stop the servo-mechanism 31. Of course the above described operation of the servo-mechanism is in addition to or as an override control to their normal operation in positioning the photoconductive cells 11 and 12 to follow the trace 31 as described above with reference to FIGURE 1.

While the above description was with relation to a means for reproducing the recorded trace in substantially the same form, the trace could also be reproduced in a different form. For example, the bar 33 and its center 34 could be used to actuate a device to cause the record to be reproduced on a magnetic tape. The movement of the center 34 of the bar 33 could be converted to an electrical signal which would then record on a magnetic tape. Similarly, this movement of the bar 33 could be used to reproduce a variable area record.

Accordingly, this invention should not be limited to the particular details described and illustrated above but only to its broad spirit and scope.

I claim as my invention:

1. An apparatus for following a recorded trace and producing a new record related thereto, said apparatus comprising: mounting means for supporting the record containing said trace and moving said record in a direction corresponding substantially to the direction in which said trace was recorded; an illumination means disposed to illuminate the portion of the record supported on said mounting means containing said trace; two light sensitive means disposed adjacent said mounting means; focusing means disposed between the illuminated portion of the record and said light sensitive means; said focusing means being adjusted to focus the light from the illuminated portion of the record on said light sensitive means; each of said light sensitive means being adjusted to respond to a predetermined light intensity generated by a portion of said trace and the adjacent background of said record along the opposite edges of said trace; servo-mechanisms for positioning said light sensitive means laterally with respect to the movement of said record; limit means coupled to said servo-mechanisms to control the maximum and minimum displacement between said light sensitive means; and a recording means coupled to said servo-mechanisms to record the movement thereof.

2. The apparatus of claim 1 and a continuity means to indicate the continuity of movement of said light sensitive means, said continuity means being coupled to the maximum and minimum displacement control means.

3. The apparatus of claim 1 and a first switch means disposed to be actuated when said light sensitive means converge beyond a preset limit; a second switch means disposed to be actuated when said light sensitive means diverge beyond a preset limit; a third switch means disposed to be actuated by the failure of one of said light sensitive means to follow a smooth trace, a fourth switch means disposed to be actuated by the failure of the other of said light sensitive means to follow a smooth trace; said servo-mechanisms being coupled to said first, second, third and fourth switch means, said servo-mechanisms being actuated to move said light sensitive means upon the closure of one of said first and second switch means and one of said third and fourth switch means.

References Cited in the file of this patent

UNITED STATES PATENTS

| | | |
|---|---|---|
| 2,445,041 | Scholz | July 13, 1948 |
| 2,503,052 | Keinath | Apr. 4, 1950 |
| 2,838,683 | Munro | June 10, 1958 |